United States Patent [19]

Boucher

[11] Patent Number: 4,643,083

[45] Date of Patent: Feb. 17, 1987

[54] ALCOHOL-FREE WINE AND ITS MANUFACTURE

[75] Inventor: Armand R. Boucher, Stamford, Conn.

[73] Assignee: Joseph E. Seagram & Sons, Inc., New York, N.Y.

[21] Appl. No.: 746,075

[22] Filed: Jun. 18, 1985

Related U.S. Application Data

[62] Division of Ser. No. 523,466, Aug. 16, 1983 which is a continuation-in-part of Ser. No. 341,362, Jan. 21, 1982, abandoned, which is a continuation-in-part of Ser. No. 445,064, Nov. 29, 1982, U.S. Pat. No. 4,570,534.

[51] Int. Cl.⁴ .................................................. C12F 1/00
[52] U.S. Cl. ........................................ 99/275; 99/277.2
[58] Field of Search .............. 99/275, 276, 277, 277.1, 99/277.2, 278, 323.1, 323.2; 426/14, 15, 492, 426/493, 494

[56] References Cited

U.S. PATENT DOCUMENTS 393,057  11/1888  Bowick ............................... 99/277.1
581,207  4/1897   Hewitt ................................. 99/276
1,152,154 8/1915  Donitz ................................. 426/14
1,800,940 4/1931  Heuser ............................... 426/493

FOREIGN PATENT DOCUMENTS 2076852 12/1981 United Kingdom .

Primary Examiner—Robert W. Jenkins
Attorney, Agent, or Firm—Kane, Dalsimer, Kane, Sullivan and Kurucz

[57] ABSTRACT

A system and method of manufacturing an alcohol free wine beverage utilizes as a starting material diluted mature table wine which is thereafter exposed to reduced heat at low feed rates for a short period of time to strip the alcohol under high vacuum conditions while preventing scorching and degradation of the extracted wine base. This wine base is then blended with other ingredients including concentrated grape juice flavorant, carbon dioxide, citrus acid preservatives and further water to cut to a lower level the alcohol content prior to bottling.

7 Claims, 1 Drawing Figure

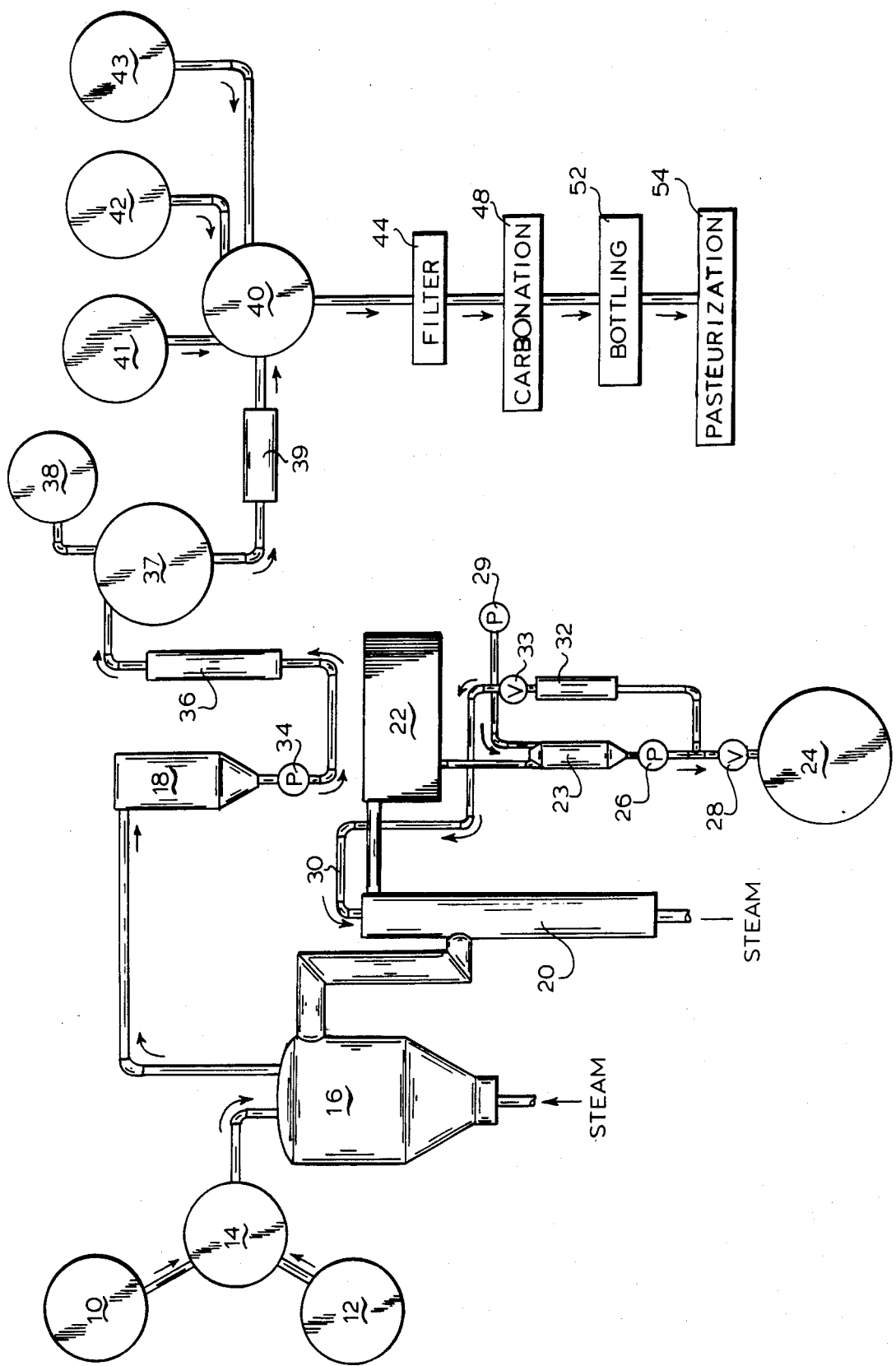

ALCOHOL-FREE WINE AND ITS MANUFACTURE

REFERENCE TO RELATED APPLICATIONS

This is a division, of application Ser. No. 523,466, filed Aug. 16, 1983 which is a continuation-in-part of commonly assigned U.S. application Ser. Nos. 341,362 filed Jan. 21, 1982 and 445,064 filed Nov. 29, 1982.

BACKGROUND OF THE INVENTION

There is a continuing consumer demand for low calorie foods and beverages. Market growth and penetration of low calorie soft drinks and light beers have risen dramatically. The wine industry has recently introduced several low calorie wines which appear to be gaining consumer appeal. In keeping with this trend, several alcohol free wines have been introduced but with questionable and varying degrees of acceptance because of quality. However, of far greater importance is the ever increasing requirement for an alcohol free beverage for those who elect not to partake in alcohol for diverse reasons and for those who may have a drinking problem. Thus, there remains a need for a consumer acceptable alcohol free wine of improved quality.

In the past, efforts have been made to produce non-alcohol wine using methodology of distillation and/or evaporation. Reports on such efforts, generally indicate poor quality. These processes involved either high temperatures or long holding time due to the nature of the equipment involved. As would be expected, a large reduction of the original water and consequent concentration of non-volatile acids would take place.

SUMMARY OF THE INVENTION

A principal object of the invention is to provide an alcohol free wine that responds to the identified consumer requirement and/or need that is not filled by any other wine now sold in the United States or abroad, namely, a wine with substantially fewer calories, appealing taste and, above all, substantially no alcohol.

Another object is an alcohol free wine production process that may be installed and deployed year round without limitation to times of harvest or seasons of the year.

Still another object is to utilize a finished table wine and convert it into a low calorie, alcohol free wine.

A further object is to provide an improved process for converting a finished table wine to an alcohol free wine in which essentially all of the feed wine without the alcohol and highly volatile ingredients appears in the finished product.

A still further object is to produce a high proof vapor by-product from the alcohol free wine production process that is a superior quality brandy alcohol.

The term "alcohol-free" as used herein is a wine derived beverage having less than 0.5% alcohol content considered by the Bureau of Alcohol, Tobacco Products and Firearms Division of the U.S. Treasury Department as not being a wine for tax purposes. It should be understood that if this limit varies it is intended that the term "alcohol-free" as used herein will vary accordingly.

BRIEF DESCRIPTION OF THE DRAWINGS

The FIGURE is a schematic view of the flow diagram of the alcohol free wine production process incorporating the teachings of the present invention.

DETAILED DESCRIPTION

In the FIGURE, an embodiment of the invention is illustrated on which a wine preblend is processed and converted into an alcohol free wine and a superior brandy alcohol by-product. Thus, an original finished table feed wine from tank 10 normally having 11-12% alcohol content and demineralized and/or distilled water from tank 12 are fed into a mixing tank 14 within which a wine preblend is formed. Any type of mixing system may be employed including pump or mechanical agitator. A ratio of approximately 58% feed wine to 42% water will produce a workable preblend. In any event, the preblend will have an alcohol content of 6-7% and according to a successful embodiment of the invention possess an alcohol content of approximately 6.8%. As will be apparent shortly, the addition of water protects and preserves the essential character and organoleptic properties of the original table wine without degradation or scorching during the subsequent processing steps. Enough water is added to the feed wine for the preblend to arrive at an alcohol reduced base wine that will permit final cutting by water of alcohol to below 0.5% and to keep the original feed wine content about 50% in the final product (whether final water content is derived from this feed wine or added water).

The wine preblend is then fed into a centrifugal film evaporator 16 which operates in reducing the preblend into a liquid phase which is an alcohol reduced base wine fed therefrom into receiver 18 and a vapor phase which is condensed. The centrifugal film evaporator 16 is disclosed in detail in the above referenced patent applications. Towards this end, the evaporator 16 may be obtained commercially from Alfa-Laval AB, Lund, Sweden under its tradenames CMF6 and CMF9. Unlike those specific applications the feed rate of the preblend is reduced enough to obtain a base wine having less an 1% alcohol. In some instances, the rate is reduced to one-third to assure contact of the liquid as a thin film on the steamheated cones of the evaporator. Moreover, operation of the process of this invention is at very high vacuum conditions. The contact time of the preblend with the heat transfer surfaces of the evaporator is very short and less than a second; and, therefore, no molecular decomposition or transformation takes place due to chemical reaction. The alcohol reduced base wine leaving the evaporator 16 will range in alcohol content from 0.5% to 1% and in accordance with successful applications of this invention will normally be approximately 0.70-0.8% and preferably 0.75% alcohol. In addition, the yield has ranged from 60-65% of the feed wine.

Referring now to the vapor phase system, the vapor phase from the evaporator 16 may be processed according to application Ser. No. 341,363 or may be exposed to a rectifying action within the column 20 which may be of the type disclosed in application Ser. No. 445,064. Similarly, the higher proof vapor product is condensed and cooled within condenser 22, fed into receiver 23 and then transferred to a storage tank 24 by pump 26 through back pressure control valve 28. A vacuum for system is provided by vacuum pump 29 which is connected to the receiver 18 as shown. A reflux return line 30 having rotometer 32 feeds the higher proof by-product back to the top of the column 20 through the reflux control valve 33 to facilitate and enhance the distillation process.

Pump 34 draws the alcohol reduced base wine from evaporator 16 into the receiver 18. This base wine is then cooled by heat exchange 36 and then fed into storage tank 37. The essential character and organoleptic properties of the original feed wine including the ph level is retained by the alcohol free base wine in tank 37. However, some of the original bouquet is lost with the removal of the higher alcohols by the evaporator 16. Accordingly, the present invention contemplates adding grape juice concentrate to restore flavor and bouquet. The concentrate is produced in the Alfa-Laval evaporator and therefore such a concentrate has no molecular decomposition or transformation due to chemical reaction. This addition may be done directly into tank 37 from juice concentrate tank 38 or perhaps at some other location in the process if desired or found more practical. This mixture will normally have approximately 0.6% alcohol and may be filtered at this time by filter 39 which may be of the millipore type.

The remaining processing steps may be performed shortly thereafter or at a later period of time at the same plant, wine making facility or at a removed bottling plant. Towards this end, if the bottling plant is at a different location, the alcohol base wine and grape juice concentrate mixture will be appropriately transferred to tank 40. Further demineralized water from tank 41 will be added together with citric acid from source 42 as well as further grape juice concentrate from source 43. The citric acid contributes to mouth feel and desired level of tartness. The added grape juice concentrate finally adjusts the organoleptic level of taste. The alcohol content of the mixture is now lowered to a level below 0.5%. Thereafter, the mixture is filtered at station 44 by a millipore filter. Carbonization ($CO_2$) is then introduced at station 48. Normally, 350-400 grams/100/ml will be sufficient for such purposes to attain a prescribed level of effervescence for improvement of tactual properties. Then the mixture may have sulphur dioxide ($SO_2$) added as a preservative. At bottling station 52, the mixture is discharged into bottles by means of a conventional counter pressure filler and thereafter capped. In order to complete the preservation of the bottled mixture, a pasteurization step 54 is employed if desired or necessary.

Suitable grape juice concentrate usable with the present invention for producing an alcohol free white wine using a chablis feed wine are the Muscat and blends thereof, with the main volume being Thompson or French Columbard seedless grape juice in the proportion of about 20%-10% to 80% to 90%. In blending an alcohol free rosé wine, a Malvasia Bianco or Muscat concentrate would be substituted for the Muscat in the same proportions. In addition, Red Concord grape juice concentrate for coloring could be added to the alcohol free white wine beverage along with enough Muscat to impart a rosé character. Similarly, in producing an alcohol free red wine, enough Red Concord grape juice concentrate may be added to the alcohol free white wine beverage for obtaining the desired red wine color.

It is also contemplated that the alcohol free drinkable white wine beverage may be utilized to manufacture a champagne. In this connection, a yeast-type of character is sought; and either an additive may be introduced for such purpose or the beverage may be subjected to further fermentation which would have the same effect.

In view of adding sulphur dioxide as a preservative or in conjunction therewith, the finished and bottled alcohol free wine beverage may be pasteurized according to conventional techniques to eliminate any possible bacteria, yeast or other organism and/or spores. In addition, the CMF equipment could be deployed for flash pasteurization by exposing the thin film of base wine with demineralized water from tank 37 to cone temperatures of about 170° F. with no vaporization vacuum applied.

The following examples describe the manner and process of making and using the invention and sets forth the best mode contemplated by the inventor of carrying out the invention but are not to be construed as limiting. In carrying out these and other examples the chemical analysis results reported were determined by gas chromatograph.

EXAMPLE 1

Employing the apparatus and system described above and depicted in the FIGURE, a matured California white chablis feed wine at 11.2% alcohol was processed as follows utilizing an Alfa-Laval CMF6 and the following parameters. First a preblend was produced in mixing tank 14 having an alcohol content of 6.35% by mixing 1166 gallons of the feed wine with 870 gallons of demineralized water.

| Preblend Feed Rate | | 284 g.p.h. |
|---|---|---|
| CMF Vacuum | | 27.5" hg |
| CMF Steam Temperature | | 58° C. |
| CMF Steam Controller | | −.88 Bar |
| CMF Vapor Temperature | | 40° C. |
| The mixture balance was as follows: | | |
| Entering CMF Preblend Feed | −2036 w.g. at 6.35% = | 129.29 absolute gallons alcohol |
| Leaving CMF Wine Base | −1297 w.g. at 0.75% = | 9.7 absolute gallons alcohol |
| Leaving CMF Vapor Condensator | −717 w.g. at 15.9% = | 114.0 absolute gallons alcohol |
| Total Recovery | 2014 w.g. = | 123.7 absolute gallons alcohol |
| Recovery based on diluted wine feed: | | |
| Wine Base | 1297 gal | = 63.7% |
| Diluted Wine Feed | 2036 gal | |
| Recovery based on original wine in process: | | |
| Wine based product | 1297 gal | = 112% |
| Original wine at | 1160 gal | |

The base wine thus produced was blended with about 185 gallons white grape juice concentrate (at 62° Brix) in tank 37. After transfer to tank 40, final blending was performed utilizing the mixture of 64% base wine (with concentrate), 9.5% white grape juice concentrate (at 62° Brix) and 26.5% demineralized water. About 3.5 lbs of citric acid were added and thereafter the mixture was filtered. In addition ½ lb of $SO_2$/1000 gal of liquid was added as a preservative. The beverage was carbonated by introducing 370±20 milligram/100 ml of $CO_2$.

The finished product was bottled possessing the desirable character of the original chablis feed wine as an alcohol free white wine beverage with an alcohol content of 0.45%.

EXAMPLE 2

Employing the apparatus and system described and depicted in the FIGURE, 966 gallons of matured California Rosé feed wine blended with 574 gallons of demineralized water to produce a preblend having an alcohol content of 7.42%. The parameters of the system were set as follows:

| Preblend Feed Rate | 310 gph |
|---|---|
| CMF Vacuum | 27.5" hg |

-continued

| | | |
|---|---|---|
| CMF Steam Temperature | | 59° C. |
| CMF Steam Controller | | −.85 Bar |
| CMF Vapor Temperature | | 40° C. |
| Entering CMF Preblend Feed | 1540 gals at 7.42% = | 114 gallons absolute alcohol |
| Leaving CMF Wine Base | 990 gals at 0.93% = | 9.2 gallons absolute alcohol |
| Leaving CMF Vapor Condensate | 539 gals at 18% = | 97 gallons absolute alcohol |
| Total Recovery | 1529 gals | 106.2 |
| Recovery based on diluted wine feed | | = 64.3% |
| Recovery based on original wine process | | = 103% |

The base wine thus produced was blended with about 185 gallons of white grape juice concentrate in tank 37. After transfer to tank 40, final blending was performed utilizing 64% base wine (with concentrate), 1.5% red grape juice concentrate for color, 8% white grape juice concentrate and 26.5% gallons of demineralized water. About 3½ lbs/1000 gal. of citric acid/1000 gallons of liquid were added and the mixture was then filtered. In addition, ½ lb of $SO_2$/1000 gal of liquid was added as a preservative. The beverage was carbonated by introducing 370±20 milligram/100 ml of $CO_2$.

The finished product was bottled possessing the desirable character of the original rosé feed wine as an alcohol free rosé wine beverage having 0.43% alcohol content.

EXAMPLE 3

The procedure of employing the apparatus of the FIGURE and Example 1, a California white chablis feed wine was treated in arriving at an alcohol free wine beverage. Chemical analysis of the original chablis feed wine, the preblend, the alcohol free wine base, the base with concentrate in tank 37, and finished bottled alcohol free white wine beverage is given in Table 1 below.

TABLE 1

| | Feedwine (Chablis) | Preblend Plus Water Feedwine | Alcohol Free Wine Base | Base Plus Concentrate | Alcohol Free White Beverage Finished and Bottled |
|---|---|---|---|---|---|
| Hydroxymethyl Furfural | 0.01 | — | — | 0.03 | 0.02 |
| Furfural | 0.14 | 0.06 | 0.11 | 0.15 | 0.05 |
| Tannin, mg/liter | 398 | 160 | 285 | 420 | 228 |

EXAMPLE 4

Employing the apparatus of the FIGURE and the procedure of Example 2, a California rosé feed wine was treated in arriving at an alcohol free wine beverage. Chemical analysis of the finished bottled alcohol free rosé wine beverage is given in Table 2 below:

TABLE 2

| | Alcohol Free Rose Beverage Finished Bottle |
|---|---|
| Hydroxymethyl furfural | 0.09 |
| Furfural | 0.06 |
| Tannin, mg/liter | 338 |

Of particular significance in obtaining an acceptable alcohol free wine beverage by the present invention having desirable organoleptic properties while possessing the desirable character of the original matured feed wine are the following results based on chemical data and analysis comparable to the foregoing tables:

i. the hydroxymethyl furfural level is reduced to a level below 1/10 gram/100 liters. This ingredient contributes to a cooked character.
ii. the furfural level is reduced by approximately ⅓ to ½.
iii. The tannins are reduced by about ½. Tannins provide an astringent character.

Bottled alcohol free white, rosé and red wines of this invention possessed the following ingredients:

| | |
|---|---|
| Dealcoholized wine | 57.0% |
| Reconstituted grape juice concentrate (concentrate and water) | 42.6% |
| Carbon dioxide (370 mg/100 ml) | 0.37% |
| Citric acid (3.5 lbs/1000 gal) | 0.042% |
| Sulfur Dioxide (170 ppm total) | 0.017% |

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A system of producing an alcohol free base wine for making an alcohol free drinkable wine beverage comprising:

a source of an original finished feed wine and a demineralized water preblend;
a feed wine, water preblend inlet line coupled with the preblend source;
a feed wine, water preblend feeding means for feeding the feed wine, water preblend from the preblend source through the inlet line;
a centrifugal film evaporator coupled with the inlet line for elevating the temperature of the feed wine, water preblend while being centrifuged to a temperature at which a predetermined part thereof is divided into a liquid phase and another part into a vapor phase, the liquid phase being the alcohol free base wine, the centrifugal film evaporator having means for removing the liquid phase by centrifugation from the evaporator; a first source of the original finished feed wine and a second source of the demineralized water being provided; and
means for coupling the first and second sources to the preblend source.

2. A system of producing an alcohol free base wine for making an alcohol free drinkable wine beverage comprising:

a source of an original finished feed wine and a demineralized water preblend;
a feed wine, water preblend inlet line coupled with the preblend source;
a feed wine, water preblend feeding means for feeding the feed wine, water preblend from the preblend source through the inlet line;
a centrifugal film evaporator coupled with the inlet line for elevating the temperature of the feed wine, water preblend while being centrifuged to a temperature at which a predetermined part thereof is divided into a liquid phase and another part into a vapor phase the liquid phase being the alcohol free base wine, the centrifugal film evaporator having means for removing the liquid phase by centrifugation from the evaporator;

a source of grape juice concentrate being provided; and means for feeding the grape juice concentrate into the alcohol free base wine in a predetermined ratio.

3. A system of producing an alcohol free drinkable wine beverage comprising:

a first source of an original finished feed wine;

a second source of demineralized water;

mixing means coupled with the source for mixing the original finished feed wine and demineralized water in a predetermined ratio to provide a source of a feed wine, water preblend;

a feed wine, water preblend inlet line coupled with the preblend source;

a feed wine, water preblend feeding means for feeding the feed wine, water preblend from the preblend source through the inlet line;

a centrifugal film evaporator coupled with the inlet line for elevating the temperature of the feed wine, water preblend while being centrifuged to a temperature at which a predetermined part thereof is divided into a liquid phase and another part into a vapor phase, the liquid phase being the alcohol free base wine, the centrifugal film evaporator having means for removing the liquid phase by centrifugation from the evaporator;

a source of grape juice concentrate;

means for mixing the grape juice concentrate into the alcohol free base wine in a predetermined ratio;

a second source of demineralized water from the second source into the base wine, juice concentrate mixture to reduce the alcohol content thereof to a further lower amount;

bottling means for bottling the mixture having a further reduced alcohol content.

4. The invention according to claim 3, wherein a filter means filters the mixture having a further reduced alcohol content prior to bottling.

5. The invention according to claim 3, wherein means for introducing carbon dioxide introduces this gas into the mixture having a further reduced alcohol content prior to bottling.

6. The invention in accordance with claim 3, wherein means for introducing sulphur dioxide introduces this gas into the mixture having a further reduced alcohol content prior to bottling.

7. The invention in accordance with claim 3, wherein means for introducing citric acid introduces this acid into the mixture having a further reduced alcohol content.

* * * * *